United States Patent [19]
Eilerts

[11] Patent Number: 6,150,295
[45] Date of Patent: Nov. 21, 2000

[54] POLYMERIZATION CATALYSTS AND PROCESSES THEREFOR

[75] Inventor: Nancy W. Eilerts, Bartlesville, Okla.

[73] Assignee: Phillips Petroleum Company, Bartlesville, Okla.

[21] Appl. No.: 09/050,695

[22] Filed: Mar. 30, 1998

[51] Int. Cl.[7] ............................. B01J 23/40; B01J 23/755
[52] U.S. Cl. ..................... 502/117; 502/117; 502/123; 502/167; 502/169; 502/170; 502/172
[58] Field of Search ...................... 502/117, 123, 502/167, 169, 170, 172, 200; 508/591; 526/135, 145, 161, 352

[56] References Cited

U.S. PATENT DOCUMENTS

| | | | |
|---|---|---|---|
| 5,461,126 | 10/1995 | Knudsen et al. | 526/96 |
| 5,492,983 | 2/1996 | Olonde et al. | 526/64 |
| 5,714,556 | 2/1998 | Johnson et al. | 526/135 |
| 5,811,379 | 9/1998 | Rossi et al. | 508/591 |
| 5,932,670 | 8/1999 | Koppl et al. | 526/161 |

FOREIGN PATENT DOCUMENTS

WO 96/23010  8/1996  European Pat. Off. .

OTHER PUBLICATIONS

"New Pd(II)–and Ni(II)—Based Catalysts for Polymerization of Ethylene and Alpha–Olefins" J. Am. Chem. Soc., 1995, vol. 117, 6414–6415. (Johnson et al.), Mar. 1995.

*Organometallics* 1997 (vol. 16, pp. 384–391) (Crociani et al.).

Primary Examiner—Mark L. Bell
Assistant Examiner—Michael J. DiVerdi
Attorney, Agent, or Firm—Lynda S. Jolly

[57] ABSTRACT

Novel catalyst systems which comprise pyridine-2-carboxaldimine nickel complexes can be used with methylaluminoxane in slurry polymerization processes to polymerize mono-1-olefins and, optionally a higher alpha-olefin comonomer, to produce low molecular weight polymers.

7 Claims, No Drawings

POLYMERIZATION CATALYSTS AND PROCESSES THEREFOR

BACKGROUND

This invention relates to homopolymerization of mono-1-olefin monomers, such as ethylene and propylene, and copolymerization of a mono-1-olefin monomers, such as ethylene and propylene, with at least one higher alpha-olefin comonomer.

It is well known that mono-1-olefins, such as ethylene and propylene, can be polymerized with catalyst systems employing transition metals such as titanium, vanadium, chromium, nickel and/or other metals, either unsupported or on a support such as alumina, silica, titania, and other refractory metals. Supported polymerization catalyst systems frequently are used with a cocatalyst, such as alkyl boron and/or alkyl aluminum compounds. Organometallic catalyst systems, i.e., Ziegler-Natta-type catalyst systems usually are unsupported and frequently are used with a cocatalyst, such as methylaluminoxane.

It is also well-known that, while no polymer production process is easy, slurry, or loop, polymerization processes are relatively much more commercially desirable than other polymerization processes. Furthermore, the type of polymerization process used can have an effect on the resultant polymer. For example, higher reactor temperatures can result in low catalyst activity and productivity, as well as a lower molecular weight polymer product. Higher reactor pressures also can decrease the amount of desirable branching in the resultant polymer.

Most polymer products made in slurry processes, especially those polymer products made using supported chromium catalyst systems, have a broader molecular weight distribution and, therefore, the polymer product is much easier to process into a final product. Polymers made by other processes, such as, for example, higher temperature and/or higher pressure solution processes, can produce polymers having a narrow molecular weight distribution; these polymers can be much more difficult to process into an article of manufacture.

Unfortunately, many homogeneous organometallic catalyst systems have low activity, high consumption of very costly cocatalysts, like methylaluminoxane (MAO), and can produce low molecular weight polymers with a narrow molecular weight distribution. Furthermore, even though MAO can be necessary to produce a polymer with desired characteristics, an excess of MAO can result in decreased catalyst system activity. Additionally, these types of homogeneous catalyst systems preferably are used only in solution or gas phase polymerization processes.

SUMMARY OF THE INVENTION

It is an object of this invention to provide novel catalyst systems useful for mono-1-olefin polymerization.

It is another object of this invention to provide catalyst systems which are relatively simple to make, have increased activity and increased productivity.

It is a further object of this invention to provide catalyst systems which have reduced cocatalyst consumption.

It is still another object of this invention to provide an improved polymerization process.

It is yet another object of this invention to provide homopolymers of mono-1-olefins and copolymers of at least two different mono-1-olefin(s) that can be processed easily, as indicated by increased branching and a broad molecular weight distribution.

It is still another object of this invention to provide homopolymers of mono-1-olefins and copolymers of at least two different mono-1-olefin(s) that have decreased molecular weight.

In accordance with this invention catalyst systems comprising 2-pyridine carboxaldimine nickel complexes which further comprise additional ligands selected from the group consisting of β-dikenotates, halogens and mixtures thereof and methylaluminoxane are provided. Processes to make these catalyst systems also are provided.

In accordance with another embodiment of this invention, slurry polymerization processes comprising contacting ethylene, and optionally one or more higher alpha-olefins, in a reaction zone with catalyst systems comprising 2-pyridinecarboxaldimine nickel complexes which further comprise additional ligands selected from the group consisting of β-dikenotates, halogens and mixtures thereof in the presence of methylaluminoxane are provided.

In accordance with yet another embodiment of this invention, homopolymers of ethylene and copolymers of ethylene and one or more higher alpha-olefins which can be characterized as having low molecular weight, increased branching and a broad molecular weight distribution, are provided.

DESCRIPTION OF THE PREFERRED EMBODIMENTS

Catalyst Systems

Catalyst systems of this invention can be characterized as 2-pyridine-carboxaldimine nickel complexes comprising additional ligands selected from the group consisting of β-diketonates, halogens and mixtures thereof having a general formula as shown below in Compound I,

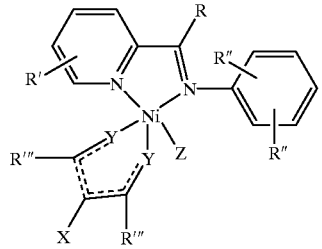

Compound I wherein R' and R" can be the same or different and are selected from the group consisting of branched and/or linear alkyl or aromatic groups having from about 1 to about 10, preferably from about 1 to about 8, carbon atoms per alkyl group and R' or R" can be in any position on the aromatic ring; and R can be the same or different and is selected from the group consisting of hydrogen and linear, branched, cyclic, bridging, aromatic, and/or aliphatic hydrocarbons, having from about 1 to about 70 carbon atoms per radical group.

R' and R" substituents on the aromatic and pyridine rings of the 2-pyridinecarboxaldimine nickel complex can be the same or different, and are selected from the group consisting of hydrogen and branched or linear, aliphatic or aromatic groups having from about 1 to about 8 carbon atoms per alkyl group. R' and R" groups having more than about 8 carbon atoms per group can result in a catalyst system with lower activity and/or productivity. While not wishing to be bound by theory, it is believed that larger substituent groups can cause steric hindrance in the catalyst system, thereby which can decrease catalyst system activity and/or productivity. Exemplary alkyl substituents are selected from the group consisting of methyl, ethyl, propyl, isopropyl, butyl, isobutyl, tert-butyl, phenyl groups, fused phenyl groups (such that the pyridine group and the substituent taken together form a quinoline group), and mixtures of two or more thereof. Preferably, the R' or R" substituent is an electron-donating species, selected from the group consisting of linear or branched aliphatic or fused aromatic groups having from about 1 to about 15 carbon atoms per group. Most preferably, the R" groups are both the same and are selected from the group consisting of methyl and isopropyl and the R' group is selected from the group consisting of hydrogen, methyl, or fused phenyl, due to commercial availability and ease of synthesis of the ligand.

The R' and R" groups can be in any position, i.e., from 2 to 6, on the aromatic ring. Preferably, the R' group is either in the 3 and/or 6 position, due to ease of synthesis. Most preferably, for best catalytic activity and productivity, the R' group is on the 6 position on the aromatic ring. Preferably, the R" groups, which can be the same or different, are either in the 2 and/or 6 position, due to ease of synthesis. Most preferably, for best catalytic activity and productivity, both R" groups are the same and are in the 2 and 6 positions on the aromatic ring.

The R substituent is selected from the group consisting of hydrogen and branched, linear, cyclic, aromatic or aliphatic radicals having from about 1 to about 70 carbon atoms per radical. Further, the R substituent can be linked, or joined, to the pyridine group to form a ring. While not wishing to be bound by theory, it is believed that radicals having more than 70 carbon atoms can add to the steric hindrance of the catalyst systems and hinder catalyst activity and productivity. Preferably, the R substituent group is selected from the group consisting of hydrogen and branched, linear, cyclic, aromatic or aliphatic radicals having from about 1 to about 20 carbon atoms per radical, due to commercial availability and ease of synthesis of the ligand. Most preferably, the R substituent is terminal or is linked to the pyridine group and is selected from the group consisting of hydrogen and branched, linear, cyclic, aromatic or aliphatic radicals having from about 1 to about 12 carbon atoms per radical, for the reasons given above. Exemplary R substituents include, but are not limited to, hydrogen, methyl, ethyl, propyl, phenyl, or linked to the pyridine to form a cyclopentyl or cyclohexyl ring. Preferably, the R substituent is selected from the group consisting of hydrogen and methyl for best resultant catalyst system activity and productivity.

R'''CYCXCYR''' substituents, or ligands, on the 2-pyridine-carboxaldimine nickel complex can be the same or different and are selected from the group consisting of α-deprotonated-β-diketones, in which R''' can be the same or different, α-deprotonated-β-ketoesters, halogens and mixtures thereof. The α-deprotonated-β-diketones and α-deprotonated-β-ketoesters can be derived from β-diketone and β-ketoester ligand precursors. Exemplary ligands precursors include, but are not limited to, compounds selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl α-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione. Preferably, ligand precursors are selected from the group consisting of 2,4-pentanedione, 1,1,1,5,5,5-hexafluoro-2,4-pentanedione, 1,1,1-trifluoro-2,4-pentanedione, 1-chloro-1,1-difluoroacetylacetone, methyltrifluoroacetoacetate, 1,1,1-trifluoro-5,5-dimethyl-2,4-pentanedione, and ethyl α-methyl-4,4,4-trifluoroacetoacetate. Most preferably, ligands include, but are not limited to 2,4-pentanedione, 1,1,1,5,5,5-hexafluoro-2,4 -pentanedione, 1,1,1-trifluoro-2,4-pentanedione, 1-chloro-1,1-difluoroacetylacetone, and 1,1,1-trifluoro-5,5-dimethyl-2,4-pentanedione for best catalyst system activity as well as best polymer product properties.

The Z substituent of the 2-pyridinecarboxaldimine nickel complex is selected from the group consisting of fluorine, chlorine, bromine, iodine, and R'''CYCXCYR'''. Preferably, the group Z selected from the group consisting of chlorine, bromine, and R'''CYCXCYR''' for high catalyst activity and productivity. Most preferably, the group Z is chlorine, 2,4-pentanedione, 1,1,1,5,5,5-hexafluoro-2,4-pentanedione, 1,1,1-trifluoro-2,4-pentanedione, 1-chloro-1,1-difluoroacetylacetone, or 1,1,1-trifluoro-5,5-dimethyl-2,4-pentanedione for best catalyst system activity and productivity.

The 2-pyridinecarboxaldimine nickel complex catalyst system disclosed in this application can be prepared by any method known in the art. For example, approximate molar equivalents of a 2-pyridinecarboxaldimine ligand and a nickel compound can be contacted in the presence of any compound that can dissolve both the 2-pyridinecarboxaldimine ligand and nickel compound, either partially or completely. The contacting conditions can be any conditions suitable to effect the formation of a 2-pyridinecarboxaldimine nickel complex. Preferably, for best product results, the 2-pyridinecarboxaldimine ligand/nickel complex mixture is contacted at room temperature under a dry atmosphere for any amount of time sufficient to form the 2-pyridinecarboxaldimine nickel complex. Completion of the formation of the 2-pyridinecarboxaldimine nickel complex can be evidenced by a color change. Generally, contacting times of about 8, and preferably 12 hours are sufficient. Usually, as a result of the preparation procedure, the resultant 2-pyridinecarboxaldimine nickel complex will comprise from about 3 to about 20, preferably from about 5 to about 15, weight percent nickel, based on the total mass of the 2-pyridinecarboxaldimine nickel complex. The presence of oxygen is not thought to be detrimental to this aspect of the preparation procedure.

Novel catalyst systems disclosed in this application can be prepared in accordance with any manner known in the art. Preparation of these novel catalyst systems does not require the presence of an oxidizing agent. Most preferably, an oxidizing agent is not present, i.e., is absent, during catalyst system preparation. In fact, while not wishing to be bound by theory, it is believed that the presence of an oxidizing agent during catalyst preparation and/or polymerization can be detrimental to either the novel catalyst system and/or the formation of a polymer product because it may cause the formation of an unstable form of the nickel complex that can decompose more easily than the parent nickel complex or the oxidizing agent may react with a cocatalyst to render the cocatalyst unreactive with the nickel complex.

In general, 2-pyridinecarboxaldimine ligands are contacted with a nickel β-diketonate or nickel β-diketonate halide to form 2-pyridine-carboxaldimine nickel complexes. Typical syntheses of nickel complexes related to those described in this invention can be found in Tom, H., Svoboda, M., and Greiser, T., *Z. Naturforsch B: Anorg.*

Chem. Organ. Chem., Vol. 36b, pp. 823–832 (1981), herein incorporated by reference. Usually, for ease of catalyst system preparation, the 2-pyridinecarboxaldimine ligand is prepared first. The catalyst preparation procedure can vary, depending on the substituents on the 2-pyridine-carboxaldimine ligand. For example, to prepare a specific 2-pyridine-carboxaldimine ligand, wherein R' is hydrogen, a three-component mixture is prepared. One molar equivalent of aniline, containing the desired R" substituents ($R_nC_6H_{(7-n)}N$, wherein n=1,2), is contacted with 2-pyridinecarboxaldehyde in the presence of a compound capable forming a separable azeotrope with water. Exemplary solvents include, but are not limited to, benzene and/or toluene. The mixture can be contacted, preferably refluxed, under any atmosphere to form the desired ligand. Preferably, the mixture is refluxed for at least 5 hours, or until the theoretical volume of water has been collected. The solution is then cooled and the desired ligand can be recovered. Generally, after refluxing and cooling, the ligand can be recovered as an oil or crystalline solid.

The nickel bis(β-diketonate), nickel bis(β-ketoester), nickel β-diketonate halide and nickel β-ketoester halide can be prepared by any method known in the art. Typical syntheses of such nickel complexes can be found in Bullen, G. J., Mason, R., and Pauling, P., *Inorganic Chemistry*, Vol. 4, pp. 456–462 (1965), herein incorporated by reference. Alternatively, and especially in the case of nickel β-diketonate halides and nickel β-ketoester halides, the salt of the β-diketone or β-ketoester can be prepared then reacted with the correct quantity of nickel halide. A mixture of an appropriate Brönsted base, such as but not limited to sodium hydride or potassium hydride or sodium methoxide or potassium methoxide, is mixed with a solvent capable of dissolving or becoming miscible with the β-diketone or β-ketoester. Exemplary solvents include toluene, benzene, methanol, or ethanol. One molar equivalent of the β-diketone or β-ketoester is added slowly to this mixture. Reaction is known to occur as evidenced by the evolution of heat and a change in the physical appearance of the mixture. Once all reactants have contacted, reaction times from 4 to 12 hours are sufficient to ensure complete reaction. If the product salt of the β-diketone or β-ketoester is not soluble in the solvent chosen, the solvent is removed by filtration or vacuum and the salt dissolved in a solvent in which it is soluble. Exemplary solvents include methanol and ethanol. This solution is then added to a one half molar equivalent of nickel halide that has been suspended or dissolved in the same solvent or a solvent with which the first solvent is miscible. The preceding reactant ratio results in the formation of the nickel bis(β-diketonate) or nickel bis(β-ketoester). If the nickel β-diketonate halide or nickel β-ketoester halide are desired, the solution is added to one molar equivalent of nickel halide as described. Reaction is known to occur as evidenced by the formation of a soluble green species. Reaction times of 4 to 12 hours are sufficient to ensure complete reaction. The byproduct sodium halide or potassium halide salt is then removed from the reaction product by filtration and/or centrifugation. The solvent is removed by vacuum to yield the nickel complex used in the 2-pyridinecarboxaldimine nickel complex synthesis.

After formation of a 2-pyridinecarboxaldimine nickel complex, the 2-pyridinecarboxaldimine nickel complex can be recovered by any method known in the art, such as, for example evaporation and/or vacuum filtration of the solvent. Further, if desired, the 2-pyridinecarboxaldimine nickel complex can be further purified by washing. One exemplary wash compound can be heptane. The 2-pyridinecarboxaldimine nickel complex catalyst system can be recovered and used as a solid, heterogeneous catalyst system.

Reactants, Polymerization and Polymer Products

Polymers produced according to the process of this invention can be homopolymers of mono-1-olefins or copolymers of at least two different mono-1-olefins. Exemplary mono-1-olefins useful in the practice of this invention include, but are not limited to mono-1-olefins having from about 2 to about 10 carbon atoms per molecule. Preferred mono-1-olefins include, but are not limited to ethylene, propylene, 1-butene, 1-pentene, 1-hexene, 1-heptene, 3-methyl-1-butene, 4-methyl-1-pentene, 1-octene, 1-nonene and 1-decene. If the reaction product is a copolymer, one mono-1-olefin monomer can be polymerized with a mono-1-olefin comonomer which is a different alpha-olefin, usually having from about 3 to about 10, preferably from 3 to 8 carbon atoms per molecule. Exemplary comonomers include, but are not limited to, propylene, 1-butene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butene in order to achieve maximum polymer product toughness and clarity.

If a comonomer is used, the comonomer can be added to the polymerization reactor, or reaction zone, in an amount within a range of about 1 to about 20 weight percent, preferably within 7 to about 18 weight percent, based on the weight of the ethylene monomer. Most preferably, a comonomer is present in the reaction zone within a range of about 10 to about 16 weight percent, in order to produce a polymer having the most desired physical properties.

Polymerization of the monomer and optional comonomer must be carried out under slurry, also known as loop/slurry or particle form, polymerization conditions wherein the temperature is kept below the temperature at which polymer swells significantly. Slurry polymerization processes are much easier to operate and maintain than other polymerization processes; a polymer product produced by a slurry process can be recovered much more easily. Such polymerization techniques are well-known in the art and are disclosed, for instance, in Norwood, U.S. Pat. No. 3,248,179, the disclosure of which is hereby incorporated by reference.

The slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product.

Exemplary diluents include, but are not limited to propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept within a range of about 5° to about 100° C. (41°–212° F.) and preferably within a range of about 10° to about 70° C. (50°–158° F). Most preferably, the reaction zone temperature is within a range of 20° to 60° C. (68°–140° F.) for best catalyst activity and productivity. Reaction temperatures below about 10° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system is kept in suspension and is contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

The catalyst system and methylaluminoxane (MAO) can be added to the reactor in any order to effect polymerization. For example, catalyst system can be added, then some reactor diluent, such as isobutane, followed by MAO, then more diluent and finally, monomer and optional comonomer. However, as stated earlier, this addition order can be varied, depending on equipment availability and/or desired polymer product properties. Preferably, the catalyst system and MAO are not precontacted prior to addition to the polymerization reactor due to a possible decrease in catalyst activity.

The amount of catalyst system and MAO added to the reactor can vary. Generally, a molar excess of MAO is present, relative to the 2-pyridine-carboxaldimine nickel complex. Preferably, the aluminum to nickel (Al:Ni) molar ratio is less than about 1500:1, more preferably within a range of about 50:1 to about 700:1. Most preferably, the molar ratio of aluminum to nickel is within a ratio of 100:1 to 500:1 for best catalyst system activity and productivity.

Two preferred polymerization methods for the slurry process are those employing a loop reactor of the type disclosed in Norwood and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after the reactor utilizing the catalyst system of this invention.

Polymers produced in accordance with this invention generally have a relatively narrow heterogeneity index (HI), which is a ratio of the weight average molecular weight ($M_w$) and the number average molecular weight ($M_n$) (also expressed as $M_w/M_n$). Polymers produced in accordance with this invention usually have a HI within a range of about 3 to about 10, preferably within a range of about 3 to about 6, for best indication of processability.

If desired, optional addition of one or more comonomers can be added to the polymerization reactor. The affirmatively added comonomers can increase the amount of short chain branching in the resultant polymer, or copolymer.

A further understanding of the invention and its advantages is provided by the following examples.

EXAMPLES

The following Examples illustrate various aspects of the invention. Data are included for each example about polymerization conditions, as well as the resultant polymer. All chemical handling, including reactions, preparation and storage, was performed under a dry, inert atmosphere (usually nitrogen). Unless otherwise indicated, bench scale polymerizations were completed in a 2.6 liter autoclave reactor at the desired temperature using an isobutane (1.2 liter) slurry. The reactor was heated to 120° C. and purged with nitrogen for about 20 minutes. The reactor then was cooled to the desired polymerization temperature and pressurized with isobutane to about 400 psig.

A known quantity (mass) of 2-pyridinecarboxaldimine nickel complex catalyst was charged to the reactor against a countercurrent of isobutane and the agitator was set at 490 rpm. If hydrogen was charged to the reactor, hydrogen addition was followed by isobutane. The desired quantity of methylaluminoxane (MAO) (10 weight % in toluene) was charged directly to the reactor via syringe. After the full volume of isobutane was added, ethylene was added to bring the total reactor pressure to 550 psig. Ethylene was fed on demand and the polymerization reaction terminated when ethylene flow into the reactor ceased. Run time for each polymerization reaction, unless otherwise specified, was 30 minutes.

The abbreviations for the catalyst systems used are as follows:

[($^i$Pr$_2$Ph)pyH]NiCl$_2$:
N-(2,6-diisopropylphenyl)pyridine-2-carboxaldimine nickel (II) chloride

[($^i$Pr$_2$Ph)pyH]Ni(hfacac)$_2$:
N-(2,6-diisopropylphenyl)pyridine-2-carboxaldimine nickel (II) bis(1,1,1,5,5,5-hexafluoro-2,4-pentanedionate)

[(Me$_2$Ph)pyH]Ni(hfacac)$_2$:
N-(2,6-dimethylphenyl)pyridine-2-carboxaldimine nickel (II) bis(1,1,1,5,5,5-hexafluoro-2,4-pentanedionate)

[($^i$Pr$_2$Ph)quinH]Ni(hfacac)$_2$:
N-(2,6-diisopropylphenyl)quinoline-2-carboxaldimine nickel (II) bis(1,1,1,5,5,5-hexafluoro-2,4-pentanedionate)

[($^i$Pr$_2$Ph)-6-MepyH]Ni(hfacac)$_2$:
N-(2,6-diisopropylphenyl)-6-methylpyridine-2-carboxaldimine nickel (II) bis(1,1,1,5,5,5-hexafluoro-2,4-pentanedionate)

[(Me$_2$Ph)pyH]NiCl$_2$:
N-(2,6-dimethylphenyl)pyridine-2-carboxaldimine nickel (II) chloride

[($^i$Pr$_2$Ph)-6-MepyH]NiCl$_2$:
N-(2,6-diisopropylphenyl)-6-methylpyridine-2-carboxaldimine nickel (II) chloride

[(Me$_2$Ph)-6-MepyH]Ni(hfacac)$_2$:
N-(2,6-dimethylphenyl)-6-methylpyridine-2-carboxaldimine nickel (II) bis(1,1,1,5,5,5-hexafluoro-2,4-pentanedionate)

[(Me$_2$Ph)-6-MepyH]NiCl$_2$:
N-(2,6-dimethylphenyl)-6-methylpyridine-2-carboxaldimine nickel (11) chloride In general, catalyst systems used for polymerization in the Examples were prepared as described in this application.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Size exclusion chromatography (SEC) analyses were performed at 140° C. on a Waters, model 150 GPC with a refractive index detector. A solution concentration of 0.17 to 0.65 weight percent in 1,2,4-trichlorobenzene was found to give reasonable elution times.

Example 1

This example shows that high catalyst system productivity can be maintained, even if the Ni:Al molar ratio is decreased. Stated another way, reduction of the amount of MAO present in the reactor does not significantly inhibit catalyst system productivity. Polymerizations in the following Runs were carried out as described above, with a reactor pressure of 550 psig ethylene in isobutane slurry at varying temperatures. MAO was added in a 10% wt/wt solution in toluene. Polymerization results are listed below in Table 1.

Comparing two levels of MAO for the same catalyst:

TABLE 1

| Run | Catalyst | Mass Catalyst (g) | T (° C.) | Productivity (g PE/g Ni) | Al:Ni Molar Ratio | Mw | Mn | HI |
|---|---|---|---|---|---|---|---|---|
| 101 | [(Me$_2$Ph)pyH]Ni(hfacac)$_2$ | 0.0076 | 27 | 10700 | 764 | 5.7 | 34 | 5.9 |
| 102 | [(Me$_2$Ph)pyH]Ni(hfacac)$_2$ | 0.0242 | 27 | 10100 | 240 | 4.7 | 28 | 5.9 |
| 103 | [(Me$_2$Ph)pyH]Ni(hfacac)$_2$ | 0.0084 | 40 | 33900 | 691 | 4.9 | 1 | 6.4 |
| 104 | [(Me$_2$Ph)pyH]Ni(hfacac)$_2$ | 0.0216 | 40 | 49600 | 269 | 4.2 | 47 | 11 |
| 105 | [(Me$_2$Ph)pyH]Ni(hfacac)$_2$ | 0.0087 | 60 | 48200 | 667 | 2.4 | 5.7 | 2.3 |
| 106 | [(Me$_2$Ph)pyH]Ni(hfacac)$_2$ | 0.0239 | 60 | 28200 | 243 | 2.2 | 5 | 2.3 |
| 107 | [(Me$_2$Ph)pyH]Ni(hfacac)$_2$ | 0.0176 | 80 | 3600 | 330 | nd | nd | nd |
| 108 | [(Me$_2$Ph)pyH]Ni(hfacac)$_2$ | 0.0280 | 80 | 750 | 207 | nd | nd | nd | nd — not determined

The data in Table 1 show that pyridine-2-carboxaldimine nickel complex/MAO catalyst systems can effectively polymerize ethylene at varying Al:Ni molar ratios. For example, Run 101 compared to Run 102 has similar productivity, even though the Al:Ni changes by a factor of greater than three (3). Similar results are shown when comparing Runs 103 and 104, Runs 105 and 106, and Runs 107 and 108. The data also show that the addition of a single β-diketonate ligand affords much higher productivity. Also note that reactor temperatures are within commercially acceptable ranges, i.e., between 25 and 80° C.

Example 2

This example shows that high catalyst system productivity can be achieved wherein pyridine-2-carboxaldimine nickel complex/MAO catalyst systems having at least one β-diketonate or β-ketoester ligand has much higher productivity than pyridine-2-carboxaldimine nickel complex/MAO catalyst systems having halide ligands. Polymerizations in the following Runs were carried out as described above, with a reactor pressure of 550 psig ethylene in isobutane slurry at varying temperatures. MAO was added in a 10% wt/wt solution in toluene. Polymerization results are listed below in Tables 2, 3, 4 and 5. The data in Table 2 show higher productivity results when have at least one β-diketonate ligand on complex (($^i$Pr$_2$Ph)pyH ligand). The data in Table 3 show higher productivity when have at least one β-diketonate ligand on complex ((Me$_2$Ph)pyH ligand). The data in Table 4 show a higher productivity when have at least one β-diketonate ligand on complex (($^i$Pr$_2$Ph)-6-MepyH ligand). The data in Table 5 show a higher productivity when have at least one β-diketonate ligand on complex ((Me$_2$Ph)-6-MepyH ligand). As used in Tables 2–5, "nd" means "not determined" and "-" indicates that an analysis could not be performed.

TABLE 2

| Run | Catalyst | Mass Catalyst (g) | T (° C.) | Productivity (g PE/g Ni) | Al:Ni Molar Ratio | Density (g/cc) | M$_w$ | M$_n$ | HI |
|---|---|---|---|---|---|---|---|---|---|
| 211 | [($^i$Pr$_2$Ph)pyH]NiCl$_2$ | 0.0245 | 27 | 4900 | 137 | 0.965 | 4.1 | 49 | 12 |
| 212 | [($^i$Pr$_2$Ph)pyH]Ni(hfacac)$_2$ | 0.0085 | 27 | 33300 | 739 | 0.968 | 5.6 | 24 | 4.2 |
| 213 | [($^i$Pr$_2$Ph)pyH]NiCl$_2$ | 0.0286 | 40 | 820 | 118 | 0.965 | nd | nd | nd |
| 214 | [($^i$Pr$_2$Ph)pyH]Nifacac)$_2$ | 0.0120 | 40 | 320000 | 524 | 0.938 | 2.3 | 4.2 | 1.8 |
| 215 | [($^i$Pr$_2$Ph)pyH]NiCl$_2$ | 0.0344 | 60 | 550 | 98 | nd | nd | nd | nd |
| 216 | [($^i$Pr$_2$Ph)pyH]Ni(hfacac)$_2$ | 0.0274 | 60 | 13800 | 229 | nd | 1.2 | 1.6 | 1.4 | nd = not determined

TABLE 3

| Run | Catalyst | Mass Catalyst (g) | T (° C.) | Productivity (g PE/g Ni) | Al:Ni Molar Ratio | Density (g/cc) | Mw | Mn | HI |
|---|---|---|---|---|---|---|---|---|---|
| 221 | [(Me$_2$Ph)pyH]Ni(hfacac)$_2$ | 0.0242 | 27 | 10100 | 240 | 0.976 | 4.7 | 28 | 5.9 |
| 222 | [(Me$_2$Ph)pyH]NiCl$_2$ | 0.0055 | 27 | 1600 | 665 | nd | 4.6 | 20 | 4.4 |
| 223 | [(Me$_2$Ph)pyH]Ni(hfacac)$_2$ | 0.0216 | 40 | 49600 | 269 | 0.960 | 4.2 | 47 | 11 |
| 224 | [(Me$_2$Ph)pyH]NiCl$_2$ | 0.0072 | 40 | 2000 | 508 | nd | 3.7 | 13 | 3.6 |
| 225 | [(Me$_2$Ph)pyH]Ni(hfacac)$_2$ | 0.0087 | 60 | 48200 | 667 | nd | 2.4 | 5.7 | 2.3 |
| 226 | [(Me$_2$Ph)pyH]NiCl$_2$ | 0.0178 | 60 | 860 | 205 | nd | nd | nd | nd |
| 227 | [(Me$_2$Ph)pyH]Ni(hfacac)$_2$ | 0.0176 | 80 | 3600 | 330 | nd | nd | nd | nd |

TABLE 4

| Run | Catalyst | Mass Catalyst, (g) | T, (° C.) | Productivity, (g PE/g Ni) | Al:Ni, Molar Ratio |
|---|---|---|---|---|---|
| 231 | [(iPr₂Ph)-6-MepyH]NiCl₂ | 0.0183 | 27 | 0 | 232 |
| 232 | [(iPr₂Ph)-6-MepyH]Ni(hfacac)₂ | 0.0085 | 27 | 1500 | 753 |
| 234 | [(iPr₂Ph)-6-MepyH]NiCl₂ | 0.0153 | 40 | 0 | 278 |
| 235 | [(iPr₂Ph)-6-MepyH]Ni(hfacac)₂ | 0.0142 | 40 | 3600 | 451 |
| 236 | [(iPr₂Ph)-6-MepyH]NiCl₂ | 0.0128 | 60 | 0 | 332 |
| 237 | [(iPr₂Ph)-6-MepyH]NiCl₂ | 0.0122 | 80 | 0 | 348 |
| 237 | [(iPr₂Ph)-6-MepyH]Ni(hfacac)₂ | 0.0224 | 80 | 0 | 286 |

TABLE 5

| Run | Catalyst | Mass Catalyst (g) | T (° C.) | Productivity (g PE/g Ni) | Al:Ni, Molar Ratio | Density (g/cc) |
|---|---|---|---|---|---|---|
| 241 | [(Me₂Ph)-6-MepyH]NiCl₂ | 0.0107 | 27 | 0 | 281 | nd |
| 242 | [(Me₂Ph)-6-MepyH]Ni(hfacac)₂ | 0.0254 | 27 | 1900 | 233 | nd |
| 243 | [(Me₂Ph)-6-MepyH]Ni(hfacac)₂ | 0.0556 | 40 | 2900 | 107 | 0.941 |
| 244 | [(Me₂Ph)-6-MepyH]Ni(hfacac)₂ | 0.0167 | 60 | 0 | 355 | nd |
| 245 | [(Me₂Ph)-6-MepyH]NiCl₂ | 0.0086 | 80 | 0 | 350 | nd |
| 246 | [(Me₂Ph)-6-MepyH]Ni(hfacac)₂ | 0.0351 | 80 | 0 | 169 | nd |

The data in this example show that pyridine-2-carboxaldimine nickel complex/MAO catalyst systems have much higher productivity with at least one β-diketonate ligand than pyridine-2-carboxaldimine nickel complex/MAO catalyst systems having only halogen ligands.

Example 3

This example compares catalyst system productivity of pyridine-2-carboxaldimine nickel complex/MAO catalyst systems wherein the R' group on the pyridine group of the pyridine-2-carboxaldimine ligand is hydrogen or a methyl group. Higher catalyst system activity can be achieved when the R' group is a hydrogen. Polymerizations in the following Runs were carried out as described above, with a reactor pressure of 550 psig ethylene in isobutane slurry at varying temperatures. MAO was added in a 10% wt/wt solution in toluene. Polymerization results are listed below in Table 6 for complexes [(iPr₂Ph)pyH]NiCl₂ and [(iPr₂Ph)-6-MepyH]NiCl₂, Table 7 for complexes [(iPr₂Ph)pyH]Ni(hfacac)₂ and [(iPr₂Ph)-6-MepyH]Ni(hfacac)₂, Table 8 for complexes [(Me₂Ph)pyH]NiCl₂ and [(Me₂Ph)-6-MepyH]NiCl₂, and Table 9 for complexes [(Me₂Ph)pyH]Ni(hfacac)₂ and [(Me₂Ph)-6-MepyH]Ni(hfacac)₂. As used in Tables 6–9, "nd" means "not determined" and "-" indicates that an analysis could not be performed.

TABLE 6

| Run | Catalyst | Mass Catalyst (g) | T (° C.) | Productivity (g PE/g Ni) | Al:Ni, Molar Ratio | Density (g/cc) |
|---|---|---|---|---|---|---|
| 311 | [(iPr₂Ph)pyH]NiCl₂ | 0.0245 | 27 | 4900 | 137 | 0.965 |
| 312 | [(iPr₂Ph)-6-MepyH]NiCl₂ | 0.0183 | 27 | 0 | 232 | — |
| 313 | [(iPr₂Ph)pyH]NiCl₂ | 0.0286 | 40 | 820 | 118 | 0.965 |
| 314 | [(iPr₂Ph)-6-MepyH]NiCl₂ | 0.0153 | 40 | 0 | 278 | — |
| 315 | [(iPr₂Ph)pyH]NiCl₂ | 0.0344 | 60 | 550 | 98 | nd |
| 316 | [(iPr₂Ph)-6-MepyH]NiCl₂ | 0.0128 | 60 | 0 | 332 | — |
| 317 | [(iPr₂Ph)pyH]NiCl₂ | 0.0394 | 80 | 0 | 85 | — |
| 318 | [(iPr₂Ph)-6-MepyH]NiCl₂ | 0.0122 | 80 | 0 | 348 | — |

TABLE 7

| Run | Catalyst | Mass Catalyst (g) | T (° C.) | Productivity (g PE/g Ni) | Al:Ni, Molar Ratio | Density (g/cc) |
|---|---|---|---|---|---|---|
| 321 | [(iPr₂Ph)pyH]Ni(hfacac)₂ | 0.0085 | 27 | 33000 | 739 | 0.968 |
| 322 | [(iPr₂Ph)-6-MepyH]Ni(hfacac)₂ | 0.0085 | 27 | 1500 | 753 | nd |
| 323 | [(iPr₂Ph)pyH]Ni(hfacac)₂ | 0.0120 | 40 | 320000 | 524 | 0.938 |
| 324 | [(iPr₂Ph)-6-MepyH]Ni(hfacac)₂ | 0.0142 | 40 | 3600 | 451 | nd |
| 325 | [(iPr₂Ph)pyH]Ni(hfacac)₂ | 0.0274 | 60 | 13800 | 229 | nd |
| 326 | [(iPr₂Ph)pyH]Ni(hfacac)₂ | 0.0059 | 80 | 38400 | 1065 | nd |
| 327 | [(iPr₂Ph)-6-MepyH]Ni(hfacac)₂ | 0.0224 | 80 | 0 | 286 | — |

TABLE 8

| Run | Catalyst | Mass Catalyst (g) | T (°C.) | Productivity (g PE/g Ni) | Al:Ni, Molar Ratio |
|---|---|---|---|---|---|
| 331 | [(Me$_2$Ph)pyH]NiCl$_2$ | 0.0055 | 27 | 1600 | 665 |
| 332 | [(Me$_2$Ph)-6-MepyH]NiCl$_2$ | 0.0107 | 27 | 0 | 281 |
| 333 | [(Me$_2$Ph)pyH]NiCl$_2$ | 0.0072 | 40 | 2040 | 508 |
| 334 | [(Me$_2$Ph)pyH]NiCl$_2$ | 0.0178 | 60 | 860 | 205 |
| 335 | [(Me$_2$Ph)pyH]NiCl$_2$ | 0.0078 | 80 | 0 | 469 |
| 336 | [(Me$_2$Ph)-6-MepyH]NiCl$_2$ | 0.0086 | 80 | 0 | 350 |

TABLE 9

| Run | Catalyst | Mass Catalyst (g) | T (°C.) | Productivity (g PE/g Ni) | Al:Ni, Molar Ratio | Density (g/cc) |
|---|---|---|---|---|---|---|
| 341 | [(Me$_2$Ph)pyH]Ni(hfacac)$_2$ | 0.0076 | 27 | 10700 | 764 | nd |
| 342 | [(Me$_2$Ph)pyH]Ni(hfacac)$_2$ | 0.0242 | 27 | 10100 | 240 | 0.976 |
| 343 | [(Me$_2$Ph)-6-MepyH]Ni(hfacac)$_2$ | 0.0254 | 27 | 1860 | 233 | nd |
| 344 | [(Me$_2$Ph)pyH]Ni(hfacac)$_2$ | 0.0084 | 40 | 33900 | 691 | nd |
| 345 | [(Me$_2$Ph)pyH]Ni(hfacac)$_2$ | 0.0216 | 40 | 49600 | 269 | 0.960 |
| 346 | [(Me$_2$Ph)-6-MepyH]Ni(hfacac)$_2$ | 0.0556 | 40 | 2900 | 107 | 0.941 |
| 347 | [(Me$_2$Ph)pyH]Ni(hfacac)$_2$ | 0.0087 | 60 | 48200 | 667 | nd |
| 348 | [(Me$_2$Ph)pyH]Ni(hfacac)$_2$ | 0.0239 | 60 | 28200 | 243 | 0.950 |
| 349 | [(Me$_2$Ph)-6-MepyH]Ni(hfacac)$_2$ | 0.0167 | 60 | 0 | 355 | — |
| 350 | [(Me$_2$Ph)pyH]Ni(hfacac)$_2$ | 0.0176 | 80 | 3640 | 330 | nd |
| 351 | [(Me$_2$Ph)pyH]Ni(hfacac)$_2$ | 0.0280 | 80 | 750 | 207 | nd |
| 352 | [(Me$_2$Ph)-6-MepyH]Ni(hfacac)$_2$ | 0.0351 | 80 | 0 | 169 | — |

Comparison of Runs wherein a MepyH or a pyH group was in the pyridine-2-carboxaldimine nickel complex shows that, usually, higher productivities are obtained with a pyH group than with a MepyH group.

While this invention has been described in detail for the purpose of illustration, it is not to be construed as limited thereby but is intended to cover all changes and modifications within the spirit and scope thereof.

What is claimed is:

1. A heterogeneous catalyst composition comprising:
   a) pyridine-2-carboxaldimine nickel complexes which further comprise additional ligands selected from the group consisting of β-diketonates halogens and mixtures thereof having a formula of:

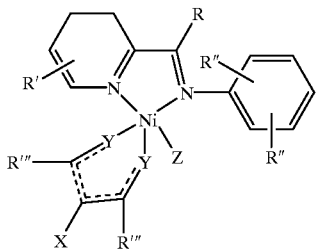

wherein R' and R" can be the same or different and are selected from the group consisting of branched and/or linear alkyl or aromatic groups having from about 1 to about 10, carbon atoms per alkyl group and R' or R" can be in any position on the aromatic ring; and R can be the same or different and is selected from the group consisting of hydrogen and linear, branched, cyclic, bridging, aromatic, and/or aliphatic hydrocarbons, having from about 1 to about 70 carbon atoms per radical group;

R'"CYCXCYR'" substituents can be the same or different and are selected from the group consisting of α-deprotonated-β-diketones, in which R'" can be the same or different, α-deprotonated-β-ketoesters, halogens and mixtures thereof; and Z is selected from the group consisting of fluorine, chlorine, bromine, iodine, and R'"CYCXCYR'", and b) methylaluminoxane.

2. A composition according to claim 1 wherein said R" substituent is selected from the group consisting of linear or branched aliphatic groups having from about 1 to about 8 carbon atoms per group.

3. A composition according to claim 2 wherein said R" substituent is selected from the group consisting of methyl groups, isopropyl groups, and mixtures thereof.

4. A composition according to claim 1 wherein said R' substituent is selected from the group consisting of hydrogen and branched, linear, cyclic, aromatic or aliphatic radicals having from about 1 to about 12 carbon atoms per radical.

5. A composition according to claim 4 wherein said R' substituent is selected from the group consisting of hydrogen, methyl groups, ethyl groups, propyl groups, phenyl groups, fused phenyl groups, acenaphthyl groups, cyclobutadienyl groups or mixtures thereof.

6. A composition according to claim 1 wherein said pyridine-2-carboxaldimine nickel complexes which further comprise additional ligands selected from the group consisting of β-diketonates, halogens and mixtures thereof and said methylaluminoxane are present in an amount to have an aluminum to nickel molar ratio of less than about 850:1.

7. A composition according to claim 6 wherein said aluminum to nickel molar ratio is within a range of about 50:1 to about 600:1.

* * * * *